United States Patent
Zhou et al.

(10) Patent No.: US 11,975,486 B2
(45) Date of Patent: May 7, 2024

(54) SWARM MANUFACTURING FOR SMART FACTORY

(71) Applicant: BOARD OF TRUSTEES OF THE UNIVERSITY OF ARKANSAS, Little Rock, AR (US)

(72) Inventors: Wenchao Zhou, Fayetteville, AR (US); Lucas Galvan Marques, Fayetteville, AR (US); Zachary Hyden, Fayetteville, AR (US); Pablo Guerra, Fayetteville, AR (US)

(73) Assignee: Board Of Trustees Of The University Of Arkansas, Little Rock, AR (US)

( * ) Notice: Subject to any disclaimer, the term of this patent is extended or adjusted under 35 U.S.C. 154(b) by 0 days.

(21) Appl. No.: 17/798,877

(22) PCT Filed: Feb. 11, 2021

(86) PCT No.: PCT/US2021/017724
§ 371 (c)(1),
(2) Date: Aug. 10, 2022

(87) PCT Pub. No.: WO2021/163379
PCT Pub. Date: Aug. 19, 2021

(65) Prior Publication Data
US 2023/0120878 A1 Apr. 20, 2023

Related U.S. Application Data

(60) Provisional application No. 62/972,976, filed on Feb. 11, 2020.

(51) Int. Cl.
*B29C 64/227* (2017.01)
*B25J 9/00* (2006.01)
(Continued)

(52) U.S. Cl.
CPC .......... *B29C 64/227* (2017.08); *B25J 9/0009* (2013.01); *B29C 64/171* (2017.08); *B33Y 30/00* (2014.12);
(Continued)

(58) Field of Classification Search
CPC ....... B25J 5/00; B25J 5/007; B25J 9/08; B25J 9/10; B25J 9/0009; B60P 3/28;
(Continued)

(56) References Cited

U.S. PATENT DOCUMENTS

| | | | |
|---|---|---|---|
| 2018/0370134 A1* | 12/2018 | Zhou | B33Y 30/00 |
| 2019/0072931 A1 | 3/2019 | Bank et al. | |
| 2019/0240912 A1 | 8/2019 | Alves | |

FOREIGN PATENT DOCUMENTS

CN 104626591 B 7/2017

OTHER PUBLICATIONS

United States International Searching Authority; International Search Report & Written Opinon for PCT/US2021/017724; dated Apr. 14, 2021; 7 pages; Arlington, VA; US.
(Continued)

*Primary Examiner* — Joseph S Del Sole
*Assistant Examiner* — John Robitaille
(74) *Attorney, Agent, or Firm* — Keith A. Vogt; Keith Vogt Ltd.

(57) ABSTRACT

The present invention provides a swarm manufacturing platform, based on a swarm 3D printing and assembly (SPA) platform as a model for future smart factories, consisting of thousands of IoT-based mobile robots performing different manufacturing operations with different end effectors (e.g., material deposition, energy deposition, pick and place, removal of materials, screw driving, etc.) and real-time monitoring. The swarm manufacturing platform transforms a 1-D factory into a 2-D factory with manufacturing robots
(Continued)

that can move across the 2-D factory floor, work cooperatively with each other on the same production jobs, and re-configure in real-time (i.e., the manufacturing robots can be digitally controlled to move, re-group, calibrate, and work on a new job in real-time).

21 Claims, 11 Drawing Sheets

(51) Int. Cl.
    *B29C 64/171*     (2017.01)
    *B33Y 30/00*     (2015.01)
    *G05D 1/00*     (2006.01)
    *G05D 1/02*     (2020.01)

(52) U.S. Cl.
    CPC ......... *G05D 1/0297* (2013.01); *G05D 1/0261* (2013.01)

(58) Field of Classification Search
    CPC ..... B29C 64/227; B29C 64/171; B33Y 30/00; G05D 1/0297
    See application file for complete search history.

(56) References Cited

OTHER PUBLICATIONS

McPherson; et al; A chunk-based slicer for cooperative 3D printing; Rapid Prototyping Journal, vol. 24 Issue: 9, pp. 1436-1446.

Lucas Galvan Marques, Robert Austin Williams, Wenchao Zhou*, A Mobile 3D Printer for Cooperative 3D Printing, 28th International Solid Freeform Fabrication Symposium, Austin, Texas, Aug. 7-9, 2017.

Jacob Currence, Rolando Morales-Ortega, Jason Steck, Wenchao Zhou, A Floor Power Module for Cooperative 3D Printing, 28th International Solid Freeform Fabrication Symposium, Austin, Texas, Aug. 7-9, 2017.

Jason Steck, Rolando Morales-Ortega, Jacob Currence, Wenchao Zhou, A Mobile Gripper Robot for Cooperative 3D Printing, 28th International Solid Freeform Fabrication Symposium, Austin, Texas, Aug. 7-9, 2017.

Laxmi Poudel, Zhenghui Sha, Wenchao Zhou*, Mechanical strength of chunk-based printed parts for cooperative 3D printing, 46th SME North American Manufacturing Research Conference, NAMRC 46, Texas, Jun. 18-22, 2018.

www.ambot.net.

https://3dprintingindustry.com/news/the-chunker-chunk-based-slicer-proposed-for-cobot-3d-printing-141602/.

Spider Robot from Simense: http://www.businessinsider.com/siemens-3d-printing-spiders-could-build-ships-and-planes-2016-4 https://www.youtube.com/watch?v=DR5D27AWbMw.

A mobile 3D printer from 3&Dbot: https://3dprint.com/15508/3dbot-mobile-3d-printer/.

Project Escher: http://projectescher.com/ (acessed via https://web.archive.org/web/20160412144710/http://projectescher.com/) Aug. 10, 2022.

* cited by examiner

SWARM MANUFACTURING FOR SMART FACTORY

RELATED APPLICATIONS

This application is a US 371 National Phase of PCT/US2021/017724, filed on Feb. 11, 2021, which claims priority to U.S. Provisional Application No. 62/972,976, filed on Feb. 11, 2020, both of which are incorporated herein in their entirety.

STATEMENT REGARDING FEDERALLY SPONSORED RESEARCH & DEVELOPMENT

This invention was made with government support by the NSF SBIR Phase I, Grant No. 0402 02518-21-0000 NG/US-NSF/AMBOTS/2019UANSF/SBIR PHAS1. The government has certain rights in the invention.

BACKGROUND OF THE INVENTION

The key mission of factories has evolved over the past decades due to market demands and economic climate, from enlarging production scale in the 1960s, reducing production cost in the 1970s, improving product quality in the 1980s, to responding rapidly to market changes in the 1990s and 2000s. In the past decade, there is a convergence of many related technologies that are poised to reshape modern factories, such as the Internet of Things (IoT), Big Data, Cyber-Physical Systems (CPS), Artificial Intelligence (AI), Additive Manufacturing (AM), and Robotics. In this context, Germany led a strategic initiative of Industry 4.0. Similar initiatives were proposed by other major industrial countries, including the United States, pointing the future of manufacturing to data-driven smart factories. While the characteristics of smart factories are generally defined, including strong customization of products, highly flexible (mass-) production, self-optimization, self-configuration, self-diagnosis, and cognition, there is a lack of consensus on the forms of future smart factories.

Driven also by the fast-changing market and increasing demand for customized products and services, modern factories have experienced a drastic transformation over the past decades and many production paradigms were proposed, such as Lean Production, Agile Manufacturing, Cellular Manufacturing Systems (CMS), Computer Integrated Manufacturing System (CIMS), Flexible Manufacturing System (FMS), and Reconfigurable Manufacturing Systems (RMS). However, they are mostly still based on Henry Ford's century-old idea of assembly lines, organized with standalone manufacturing machines in a 1-D format as production/assembly lines.

BRIEF SUMMARY OF THE INVENTION

In one embodiment, the present invention provides a swarm manufacturing platform, based on a swarm 3D printing and assembly (SPA) platform as a model for future smart factories, consisting of thousands of IoT-based mobile robots performing different manufacturing operations with different end effectors (e.g., material deposition, energy deposition, pick and place, removal of materials, screw driving, etc.) and real-time monitoring.

In another embodiment, the present invention provides a swarm manufacturing platform that transforms a 1-D factory into a 2-D factory with manufacturing robots that can move across the 2-D factory floor, work cooperatively with each other on the same production jobs, and re-configure in real-time (i.e., the manufacturing robots can be digitally controlled to move, re-group, calibrate, and work on a new job in real-time).

In other embodiments, the present invention can provide the following products and services:
1. Swarm manufacturing platforms that may include manufacturing robots, mobile platforms, floor tiles, and other accessories.
2. The ability to build and set up factories equipped with thousands of robots for production, such as for a retailer that transforms it from being a local shopping center into a local production center.
3. The ability to build and set up centralized factories and sell production services. Anyone with a design or product can use the facility for production without worrying about the details of production management such that they only need to focus on product design and development.

In other embodiments, the present invention provides the following advantages: 1. Size of the print: It takes the printhead out of a box and therefore is not limited by a printing volume like existing 3D printers (i.e., the ability to print very large objects). 2. Multi-material printing: the present invention can easily print objects with multiple materials. This is very difficult to do for existing 3D printers due to the geometric constraints to put multiple printheads inside a box and coordinate these printheads without interfering with each other. 3. Multi-process printing: Any single 3D printing process has its pros and cons. With the cooperative 3D printing platform of the present invention, it is possible to use multiple different 3D printing processes to print a single object cooperatively. For example, the present invention can use a robot carrying an extrusion head for filaments, a robot carrying an inkjet printhead, and a robot carrying an extrusion head for a liquid photopolymer to work together on a single object and therefore take advantages of the benefits of each printing process. 4. Printing speed: the present invention can increase scale by using thousands of robots to cooperatively print a single object. Each robot prints one chunk and the robots print simultaneously, which can significantly boost the printing speed. 5. Assembly: Using a robot carrying a gripper, the present invention can pick and place pre-manufactured components (e.g., ICs, CPU, memory, etc.) in the structure during the 3D printing process and therefore achieve automatically assembly without using an inflexible and expensive assembly line. The use of pre-manufactured components (e.g., something that cannot be manufactured very well by 3D printing at this moment) can also significantly enhance the overall quality of the printed products. Also, compared with existing assembly lines, the assembly platform costs much less and has much more flexibility, and can be used to mass-produce multiple products at the same time without increasing the cost. 6. Smart factory: all the robots will be connected to the Internet over Wi-Fi and can be monitored and controlled remotely. The cost of maintaining such a factory would be significantly reduced. The factory can also be provided as a service to anyone who needs a production capability without the need for heavy investment to build a factory. In this case, the present invention may use centralized production centers that can provide production capability around the world, which will significantly reduce the cost and complexity of the supply chain.

In another embodiment, the present invention provides a manufacturing system comprising: a plurality of positionable robots, at least one transporter; and a plurality of connectable floor tiles having an x-axis and y-axis; the transporter includes a plurality of omnidirectional wheels, a motor, a plurality of spaced-apart carrier mounts, a power source and an opening; each of the robots having a base, the base is sized to fit within the opening of the transport; the base is positionable between a mounted position and a transport position; when the base is in the mounted position, the base is connected to one or more of the floor tiles; and when the base is in the transport position, the base is disconnected from the floor tiles.

In another embodiment, the present invention provides a manufacturing system that uses a plurality of robot mounts located on the robot and a plurality of carrier mounts located on the transporter, the robot mounts are connected to the carrier mounts when the base is in the transport position, and the robot mounts are disconnected from the carrier mounts when the base is in the mounted position. The plurality of robot mounts and the plurality of carrier mounts may also nest together when the base is in the transport position.

In another embodiment, the present invention provides a manufacturing system that uses a plurality of mounting holes, each of the holes has a predetermined location on the x and y axes of the floor tiles.

In another embodiment, the present invention provides a manufacturing system that uses a plurality of detectable markers, each marker is used by the system to determine the orientation of the transporter on the floor tiles and the location of the transporter on the floor tiles.

In another embodiment, the present invention provides a manufacturing system that uses detectable markers that include one or more codes, each of the codes provides information on the direction of movement of the transporter and the location of the transporter on the floor.

In another embodiment, the present invention provides a manufacturing system that uses mounting locks, the locks connect the base to the floor when the base is in the mounted position. In a preferred embodiment, the locks may be screws that are turned by electric motors. In yet another embodiment, the mounting locks provided power to the base when the base is in the mounted position.

In another embodiment, the present invention provides a manufacturing system wherein the transporter provides power to the base when the base is in the transport position. Power may also be provided to the base through the carrier mounts and the robot mounts.

In another embodiment, the present invention provides a manufacturing system including a plurality of build plates having an x-axis and y-axis, the build plates are releasably connected to the floor tiles. The build plates may also include a plurality of build plate makers, each build plate marker having a predetermined location on the x and y axes of the build plates.

In another embodiment, the present invention provides a manufacturing system including a moveable arm having at least one sensor, the sensor adapted to sense at least four different build plates markers to determine the location of the sensor on the x and y axes of the build plate.

In another embodiment, the present invention provides a manufacturing system that uses one or navigation paths, the paths are detectable by the transporter and the transporter is adapted to follow the plurality of detectable markers, each marker provides information on the orientation of the transporter on the floor and the location of the transporter on the floor.

In another embodiment, the present invention provides a manufacturing system that uses a local wireless network consisting of a local server, robots, and transporters. The server is adapted to send commands to one of the transporters to move one or more of the robots from one location on the plurality of floor tiles to another location.

In another embodiment, the present invention provides a manufacturing system wherein the robots do not communicate with one another and the local server is adapted to direct the operation of each robot and each transporter.

In another embodiment, the present invention provides a manufacturing system wherein a print job is divided into chunks and the server is adapted to prevent chunks with overhanging slopes from being printed before adjacent chunks that support the overhanging slopes.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

In one preferred embodiment, the present invention provides a manufacturing system comprising: at least one 2-D gridded factory floor with standardized floor tiles; one or more stationary manufacturing robots that can be mounted to the factory floor via mounting holes; one or more mobile platforms that transport the manufacturing robots and accessories from one location to another on the factory floor; one or more computer servers that communicate with the manufacturing robots and mobile platforms, plan and set up manufacturing jobs, monitor all production jobs with vision-based diagnostics and reinforcement-learning based feedback control; and at least one distributed network with computer nodes that store the product life cycle (from design to recycle) data in a blockchain.

As compared to other designs, the present invention includes the following important changes: 1. The manufacturing robots are stationary (i.e., separated from the mobile platform) and can be directly mounted onto the floor via digital commands and draw power from the floor, which makes it easier to use the manufacturing robots that are already used in modern factories in the swarm manufacturing-based smart factories. 2. A mobile platform designed to transport the manufacturing robots and other manufacturing accessories (e.g., build plate for 3D printing, or other manufacturing fixtures) from one location to another. The mobile platform is powered by a battery, has a mount to ensure stable transportation and continuous power of the manufacturing robots. The mobile platform carries position sensors and cameras and uses navigation marks on the floor to find paths and locations. 3. A Selective Compliance Assembly Robot Arm (SCARA) that achieves high accuracy at a low cost. Two pairs of high-ratio gears are used to increase the motion resolution and closed-loop control motors are used to ensure high positioning accuracy. 4. A modularized floor tile and connection system to ensure the precise alignment of floor tiles, which provides mounting points to which the robot releasably connects and provide power to stationary manufacturing robots and other manufacturing accessories (e.g., build plate for 3D printing, or other manufacturing fixtures), navigation marks for mobile platforms to find paths and locations, and assistive devices for manufacturing robots to calibrate positions. 5. A vision-based diagnostic and reinforcement learning-based feedback control system to diagnose problems and perform remedy actions during the manufacturing processes in real-time. 6. A distributed network that connects the users, the manufacturing robots, the mobile platforms, and computer nodes for validating and storing the PLC data with blockchain. 7. A vision-based diagnostic system that can detect and diagnose problems based on the images captured by the camera carried by the mobile platform (which emulates a human inspector) and a reinforcement learning-based method for performing remedy actions.

Figure 1:
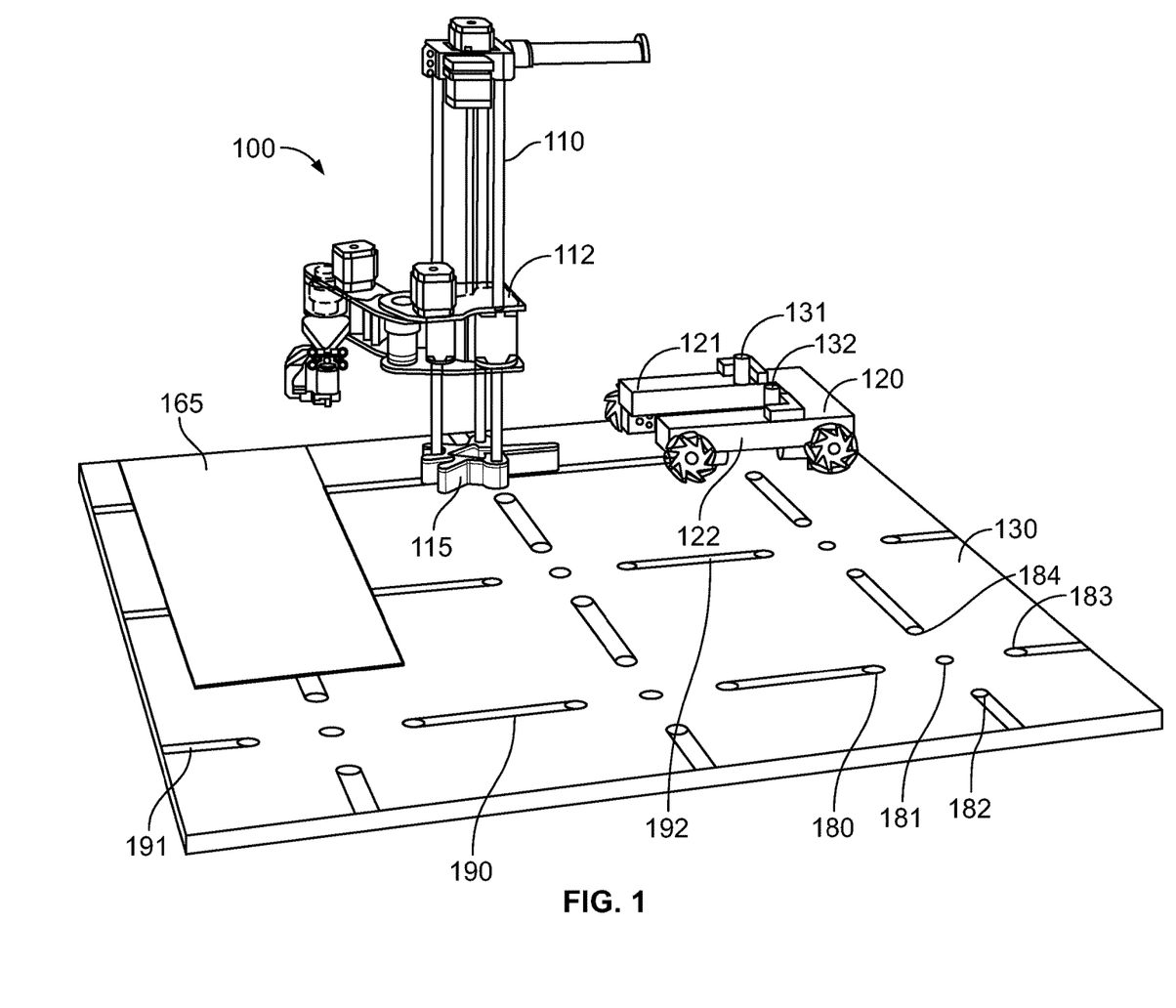
FIG. 1 illustrates a first embodiment of the present invention.

In one preferred embodiment, the present invention provides a printing system that has scalability, reconfigurability, and modularity. As shown in FIG. 1, system 100 may include the following components: one or more robots 110 which, in a preferred embodiment comprise wireless Selective Compliance Assembly Robot Arm (SCARA) 3D printing robots that can auto-calibrate and print 3D objects with quality comparable to that of a regular commercial 3D printer (e.g., Ultimaker). One or more wireless transporters or mobile platforms 120 that can navigate on the floor, autonomously charge its battery at a charging station and carry, move, and mount the SCARA robots at different locations on the platform floor tiles. Also include are one or more build plates 165.

One or more modular floor tiles 130 provide mounting points and power to the SCARA robots, navigation assistance, and charging station to the mobile platform. In addition, as discussed in further detail below, floor tiles 130 are adapted to releasably receive and secure build plates. Build plates provided service on which the manufacturing processes take place thereby protecting the factory floor comprised of floor tiles 130.

Other embodiments include a software platform to generate system commands based on user-uploaded digital models to wirelessly control the SCARA robots and mobile platforms such that they can cooperate in printing the digital model autonomously. The software platform consists of the following modules: 1. A chunk-based slicer that can divide the user-uploaded digital models into discrete chunks; assign the chunks to different SCARA robots; schedule the robots to print the assigned chunks without collisions; and generate communication commands for robots to coordinate with each other based on the schedules. 2. A robust wireless communication system that allows the SCARA robots and the mobile platform to communicate with each other. 3. A web-based user interface (UI) that allows the users to wirelessly connect to and interact with the platform and upload print files.

In operation, mobile platform 120 idles while printer 110 (although one is shown, the present invention and companies using a plurality of printers or robots with other manufacturing functionalities which are not depicted for clarity of discussion) is printing and is only used when the printer needs to move from one location to the next. Thus, mobile platform 120 remains idle most of the time. Separating mobile platform 110 from the printers increases the utility rate of the mobile platform by at least tenfold, thereby reducing cost.

Also, pairing one mobile platform with a plurality of printers creates a larger operating space by reducing the number of moving parts on floor 130 thereby reducing the potential for collisions between the moving equipment. Also, securing printer 120 to floor 130 creates a fixed base that provides enhanced stability for such operations which generate pushback forces such as screwing and cutting.

In yet another preferred embodiment, 3D printing robots 110 are mounted onto floor 130 automatically with a motor-driven locking mechanism and power charging wirelessly through the mounting holes on the floor.

Mobile platform 120 has a power source which may be a battery. The mobile platform or transporter is adapted to carry the printing robots between mounting locations and navigate to destinations while maintaining continuous power to the SCARA robot. After finishing the transporting tasks in its queue, the mobile platform will autonomously go back to the charging station to recharge its battery for future jobs. The mobile platform is equipped with infrared sensors and computer vision capability for navigation. Also, a web-based UI for users to interact with the SCARA robots and the mobile platform may be used.

The goal of the present invention is to provide an Internet-connected modular platform that allows re-configuration, auto-calibration, and cooperation of multiple manufacturing robots in a shared 2D floor space. Fundamentally, for multiple robots to cooperate, they must be able to align in space and time. There are three significant challenges in pursuing this goal, including 1) achieving a positioning accuracy of ~100 um to align robots in space; 2) a lack of a robust wireless communication system to align robots in time; 3) a lack of a wireless powering mechanism to allow mobility and reconfigurability of the robots. To overcome these challenges, the present invention provides a system consisting of three main components, a high-precision SCARA printer, a mobile platform, and a modular floor tile system, which work together to achieve the hardware design goal.

Figure 2:
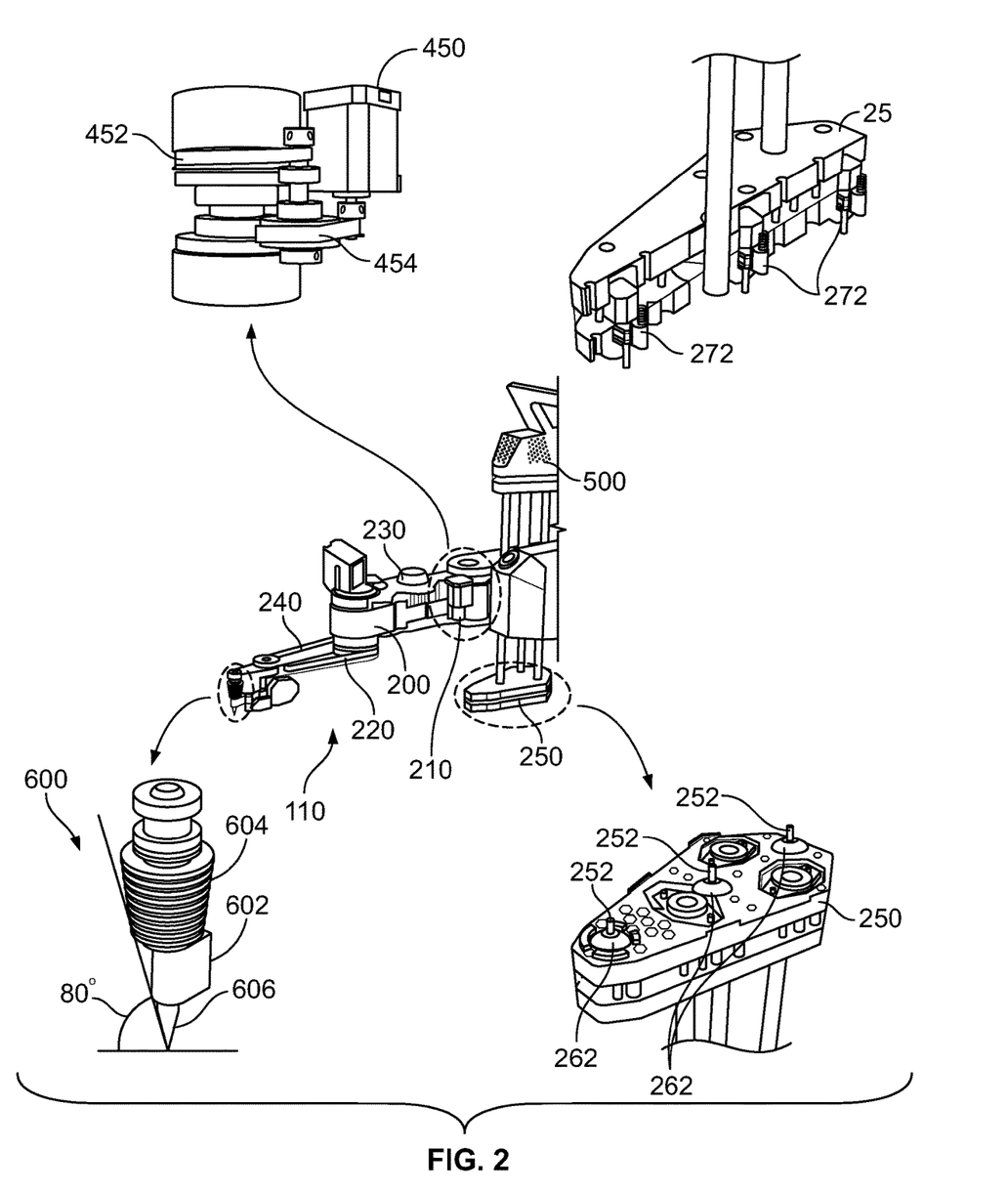
FIG. 2 is an exploded view of the components of a SCARA arm including the SCARA robot mechanical joint, underside of the mounting mechanism consisting of mounting cones and mounting screws, a sectional view showing the three motors that drive the mounting screws for mounting the base on the floor, and print chunking nozzle.

As shown in FIG. 1, exemplary robot 110, which may be a printer or some other manufacturing robot, is immobile and can communicate with the mobile platform wirelessly. For discussion purposes, robot 110 is referred to as a printer. As shown in FIG. 2, printer 110 includes arm 200, links 210 and 220, proximal arm 230, and distal arm or section 240, along with a base 250. Based 250 is configured to mount itself onto floor 130 which may be a plurality of connected tiles. The top of the printer has a spool holder 300 to hold a filament spool fed to hot end 400 at the end of the distal arm 240 through the extruder.

Joints are driven by a closed-loop stepper motor 450 geared down by a ratio of 1 using two sets of belts 452 and 454. The encoder on the stepper motor has 1000 counts per revolution (CPR), which translates into one count per 0.36 degrees. The high gear ratio ensures greater positioning accuracy. If the joints are driven directly by the stepper motor, the 0.36° accuracy provided by the encoder will result in a 4 mm error when the arm is fully extended, which is unacceptable. The use of a high gear ratio increases the number of CPR of the encoder at the output to 20,062.5 CPR, which allows the closed-loop control to guarantee a maximum error of 0.0179° and 0.21 mm when the arm is fully extended.

Arm or base 200 of the robot mounts itself onto the floor tiles using mounting locks 252, which may be screws in a preferred embodiment. The base may be designed to seat, mate or nest with mounting cones 262 in base 250 of the arm 200. The arm mounts onto the floor using screw motors in the center of mounting cones 262. The screws thread into the floor tiles to prevent any further movement and vibration while printing. The mounting cones on the underside of the base help the screws align properly with, as shown in FIG. 1, mounting holes 180-184 on the floor, which are in the shape of tapered openings. Also, the mounting screws are used as electrodes to transmit power from the floor to the arm. Power is transferred from the floor tiles to the SCARA robot through the contacts between the mounting screws and the threaded inserts. In other embodiments, the mounting locks may be any shape or form that makes or nest with the floor mounting locks.

For the chunk based cooperative printing process, the printer must be able to print directly next to the neighboring chunks so they properly bond. To achieve a 300 mm build height, this requires a print nozzle 600 that can print next to chunks with a wall angle of up to 80°. Nozzle 600 may also include heat block 602 and the heat sink 604 as well as nozzle tip 606. The newly designed nozzle allows for the printing of a chunk with a chunk angle of 80°.

Due to movement errors (e.g., errors in the mounts) and manufacturing tolerances (e.g., tolerances of the arm length), the printhead is not at the exact position in the global coordinate space, as instructed. From the perspective of the arm, there could be distortion, translation, and rotation of the build area. This error is exacerbated when the SCARA arms need to be moved to different locations on the floor during a print job. Therefore, an advanced calibration system is used to ensure the arms can print with consistency at different print locations before the print starts. To this end, the present invention in one embodiment implements a dynamic real-time calibration for both predetermined locations on the XY and Z axes on the floor tiles and build plates.

Figure 3:
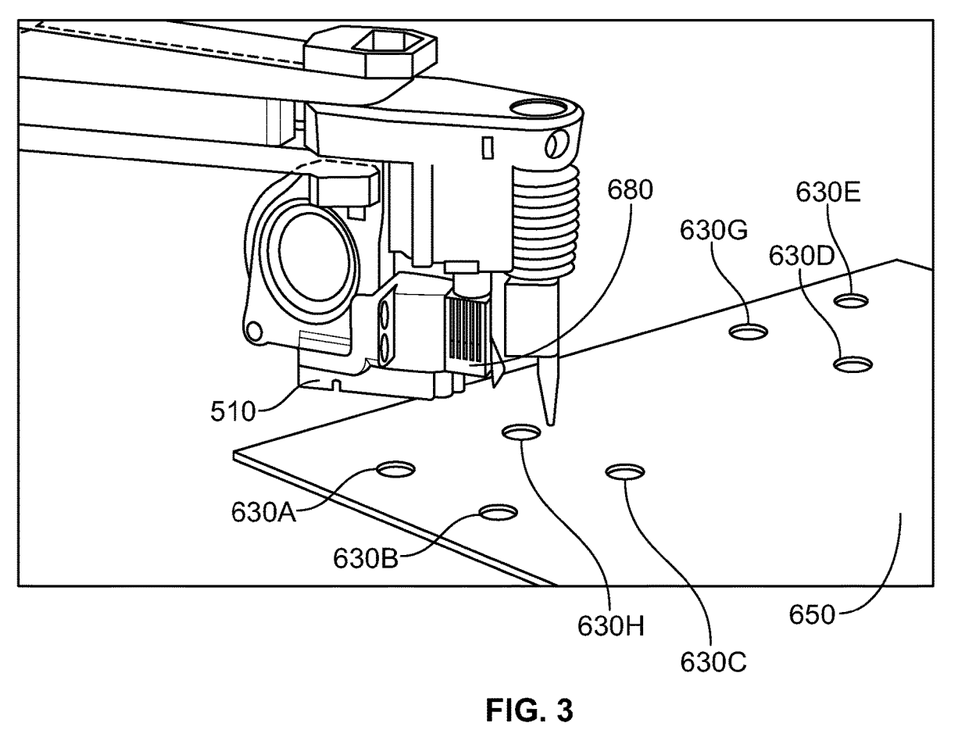
FIG. 3 shows a calibration system that may be used with an embodiment of the present invention.

As shown in FIG. 3, to calibrate the position of a device in the XY plane, the present invention deploys a sensor such as magnetometer 510 to read the coordinates of the known positions of markers 630A-630G which may be magnets or some other detectable substance, material or composition. The markers are located in predetermined locations in the X and YZ planes on floor 650, which serve as reference points for the system components, such as the arm, to calibrate a location against the global coordinate system. The calibration system works as follows in a preferred embodiment: First, each build plate has small magnets embedded as reference points so the arm can find them and use their location for calibration. Second, a magnetometer sensor is installed on the arms to locate the magnets on the build plates. Third, a calibration algorithm is developed to take the magnets' measured position and use that information to adjust the coordinate system of the arm.

Figure 4:
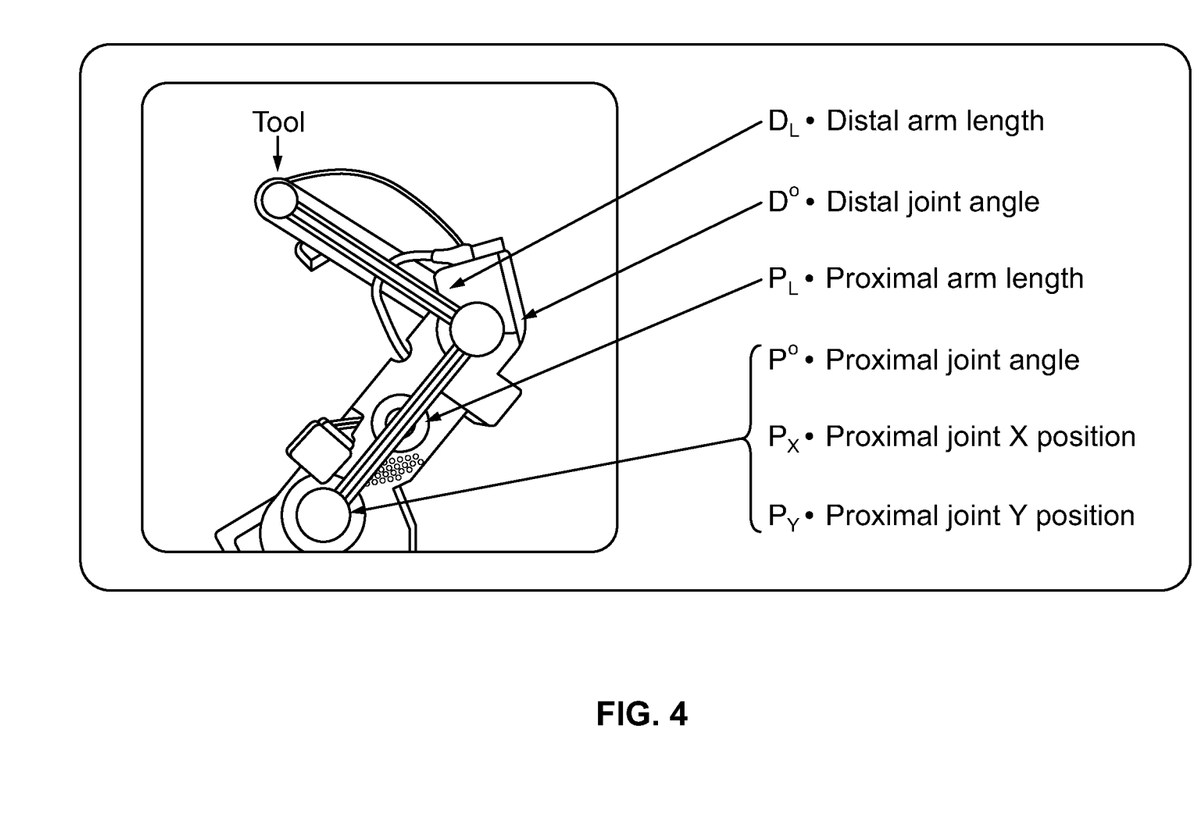
FIG. 4 shows a top view of the SCARA arm illustrating the variables used by the position control algorithm.

SCARA arm 702 uses six variables shown in FIG. 4 to calibrate its coordinate system and calculate the printhead position. The arm lengths and the proximal joint position are constant values. The joint angles are the only variable values used to control the position of the tool. The calibration algorithm measures the position of four reference points at known locations on the build plate, which provides eight equations based on geometric relationships in both X and Y directions. The eight equations are used to solve for the six unknowns in FIG. 4, which may differ from their manufacturing specifications due to tolerances and movements. This is an over-constrained problem. Therefore, the present invention seeks a set of values of the six unknowns to minimize the cumulative error using the equation (1).

$$\text{error} = f(P^o, D^o, P_L, D_L, P_x, P_y) = \sum_{pt=1}^{4} \sqrt{\left(Xpos_{pt} - Xtarget_{pt}\right)^2 + \left(Ypos_{pt} - Ytarget_{pt}\right)^2} \quad (1)$$

where $Xpos_{pt}$ and $Ypos_{pt}$ represent the actual position of the magnet found by the magnetometer sensor, $Xtarget_{pt}$ and $Ytarget_{pt}$ represent the expected position of the magnet (i.e., the known positions), and pt is the magnet point number. The error represents the level of distortion, translation, and rotation of the build area perceived by the arm. A math solver is then used to minimize the cumulative error by adjusting the six variables shown in FIG. 4. Once the minimal cumulative mistake is found, the new values for the six unknowns will be sent over to the SCARA arm position control algorithm. These new variable values ensure that the arm will navigate and print on the build plate accurately. This calibration procedure may include the steps of having the arm find a position of the four magnets on the build plate, using a math solver to minimize the cumulative error, and updating a position control algorithm with the new values.

Calibration of the Z-axis is done with touch sensor 680 that acts as a switch to inform the SCARA robot when it has touched the print bed. Z calibration consists of Z-height calibration and bed leveling, both controlled by onboard functionalities of a control board on the arm. Z-height calibration is the simpler of the two and consists of the touch probing the bed at a single point to set the Z=0. Bed leveling consists of touch probing the bed at multiple points in a grid to create a mesh of points corresponding to Z=0 across the build plate. The calibrated map of Z-height is then taken into account during the printing process to maintain a constant distance between the nozzle and the print bed, which ensures the bonding between layers.

The embodiments of the present invention increase the operation room of the SCARA printer, and on the other hand, reduce the overall cost by allowing multiple SCARA printers to share mobile platforms. It can travel at the speed of 60 mm/s and wirelessly communicate with the SCARA printers.

As shown in FIG. 1, to securely transport arm or printer 110, mobile device 120 is releasably attachable to printer 110. Printer 110 includes a base or mount 112 which is wider than arms 121 and 122 on printer 120. Mobile device 120 may include opposingly located mounts which may be in the form of pegs 131 and 132 with conic holes in the center on the top which are received by similarly shaped openings in base 112 (not shown) for self-alignment with mount 112. In addition to the use of conic holes in cones, other shapes, and arrangements that mate or nest together may be used.

The mobile platform is equipped with a rechargeable battery pack with a life cycle of 2 hours of continuous use and an idle time of 6 hours. However, if it is not in use for more than 5 minutes, it automatically retreats to a charging station located in one corner of the floor. The maximum standby time of the mobile platform is 5 hours and 50 minutes. Large-scale print jobs can last several days, so an automatic charging system is required for print jobs that take a longer time. The mobile platform also serves to supply power to the SCARA arm. While the SCARA arm is being transported from one print location to the next, the mobile platform provides power to the arm such as through pegs 131 and 132. Continuous power is required to keep the nozzle and the heater block at the required temperature and power the printer for mounting/unmounting onto the floor tile.

Mobile platform 120 may further include infrared sensors and a camera for accurate movement. These sensors use the navigation lines or paths 190-192 on the grid floor. The paths are adapted to be detectable by a sensor. They may be painted a color that contrasts with the floor for detection. Alternately, the paths may be comprised of a detectable material, substance, or composition. When the sensor is a camera, the mobile platform uses the camera to verify the positional accuracy by using computer vision to detect the path. The camera senses the path on the floor tile to obtain information such as local position, orientation, or a global position and orientation.

Figure 5:
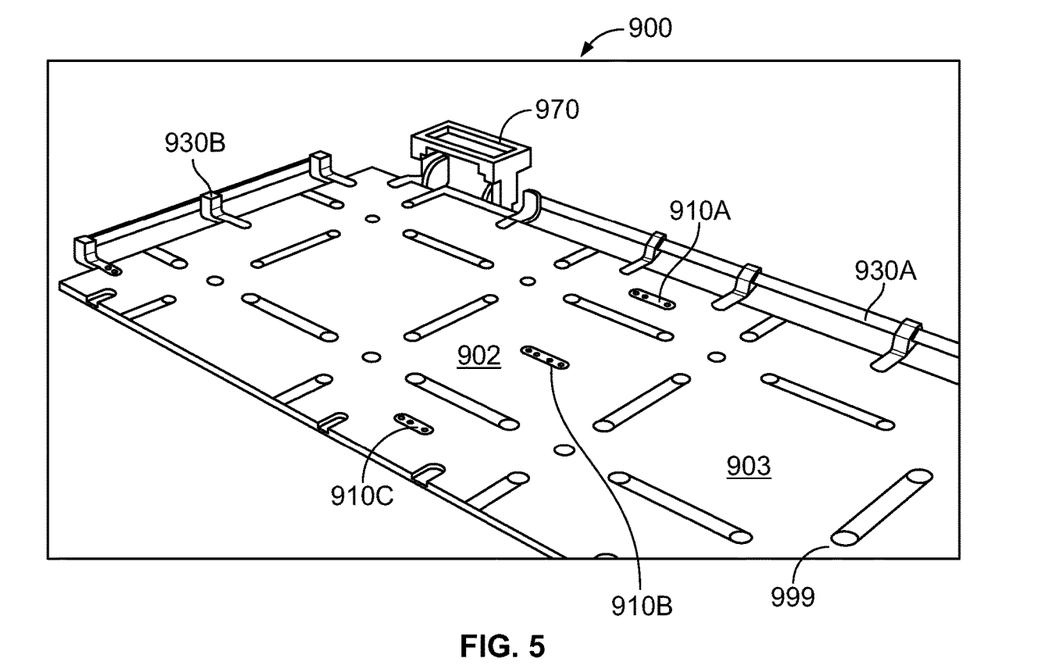
FIG. 5 illustrates a modular floor system for use with an embodiment of the present invention.
Figure 6:
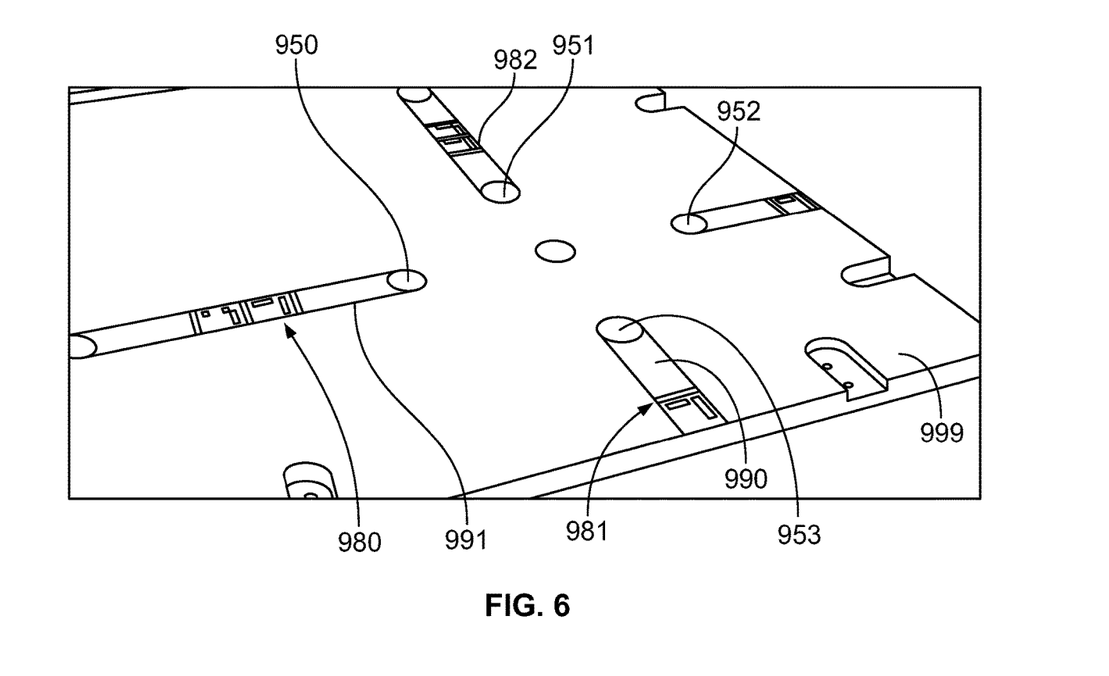
FIG. 6 illustrates a modular floor system for use with an embodiment of the present invention.

The printing system of the present invention may also utilize a modularized floor tile system 900 as shown in FIGS. 5 and 6. Floor tile system 900 may consist of a plurality of tiles 902 and 903 connected by tile connectors 910A-910C. Each floor tile is 600 mm×600 mm, with four mounting holes 950-953 equally spaced at 300 mm apart in both X and Y directions forming a square pattern. Also provided are railings 930A and 930B.

As shown in FIG. 6, markers 980-982 containing detectable codes such as ArUco markers. Markers 980-982 are placed in predetermined x and y locations and are preferably located on the navigation lines or paths 990 and 991 on floor 999. Markers 980-982 are used to ensure that the mobile platform moves to the desired location based on the location information encoded in the marker which may be used by the system to determine the location and orientation of a printer, robot, transporter, or mobile platform or other devices used with the system.

The modular floor tiles have slots 910A-910C on each side, which are used to align two-floor tiles and connect them. The slots are aligned by a threaded insert installed inside them. The insert is a bracket with through-holes and is used to connect multiple tiles using M4 screws.

Mounting holes 950-953 on the floor have nuts installed inside them for the lead screws of the SCARA arm to mount itself. These embedded nuts are also connected to a power supply that powers the SCARA printer during the entirety of the printing and allows avoiding the use of wires. Also, the floor tile is equipped with a charging station 970 that is mounted onto the edge of the tile. This charging station resembles a cart storage area outside a supermarket, where a mobile platform can park itself and charge its battery. Once the platform aligns itself inside the charging station, an electrical connection is formed between the charging station and the platform, initiating the charging of the platform.

Figure 7:
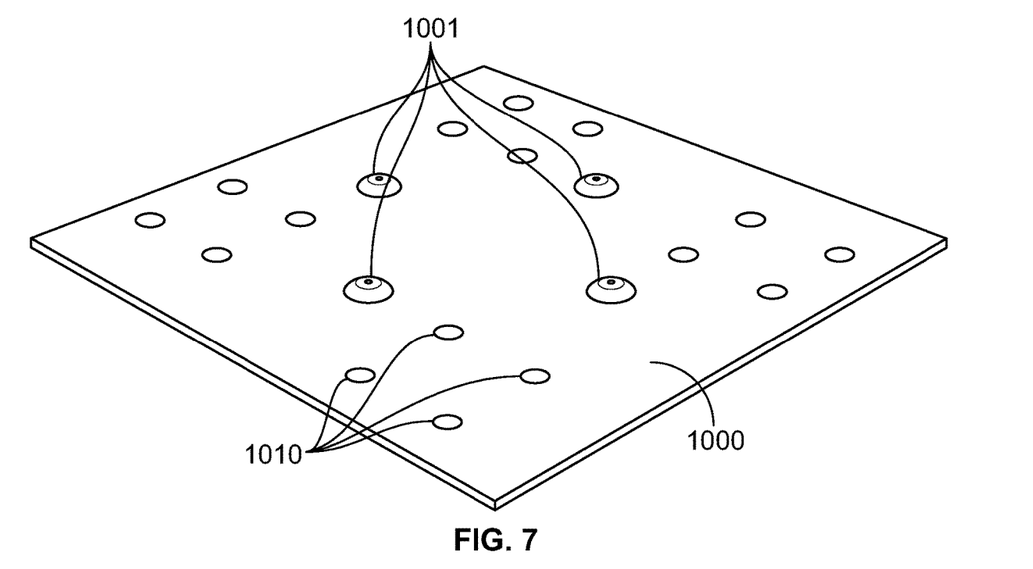
FIG. 7 shows an underside of a build plate consisting of mounting cones on the bottom of the plate and magnets used for calibration.

As shown in FIG. 7, build plate 1000 is a 300 mm×300 mm modular square block on top of which a part is printed. It is mounted on the floor tiles. In one preferred embodiment, the build plates are adapted to releasably connect to the floor using an arrangement in which there is a mating or nesting relationship. For example, conical pegs 1001 may be used to make and nest inside similarly shaped holes or openings in the floor. Using mating or nesting structures assist in aligning the build plates at the correct location and prevents the build plate from moving in the XY plane. Also, the build plate is equipped with magnets 1010 embedded in a set pattern and predetermined X and Y locations to provide positional feedback through the printer's magnetometer so that the location and orientation of the device such as an arm of the printer may be determined.

To interact and control the hardware platform over the Internet, a web-based UI may be used. It has two main modules. The first is a platform configuration and control module that allows users to set up a digital representation of the hardware platform (a digital twin) in a web-based UI. It also allows the users to interact with the hardware components in real-time and visualize the interaction in real-time (e.g., when the mobile platform moves on the floor). The UI module allows users to connect to all available robots on the same network; configure the floor tiles and the initial positions of the SCARA robots, and mobile platform based on the actual hardware configuration; move the mobile platform and SCARA robots to different locations on the floor; have granular control of all sensors and actuators on the robots via G-code commands, and display the results of the user actions.

A Chatbot that allows the users to send text-based G-code commands or scripts to control the individual robot in programming mode may also be used. Also, we have provided Restful APIs that can enable secondary development and programming of the robots over the web.

The second is a job management module that allows users to set up print jobs (e.g., upload files, set orientation, etc.), configure printing settings (e.g., setting extruder temperature), and submit print jobs. It has three components: a pre-processor for users to upload print files (e.g., STL files), manage the files, and visualize the model in 3D; a print job processor for users to manage the settings for chunking (e.g., the number of chunks to be divided and which robots the chunks will be assigned to), scheduling (e.g., the sequence of how the chunked jobs are printed), slicing (e.g., settings for G-code commands for printing and wireless communication between robots), and streaming (e.g., streaming settings for transmitting the generated commands to robots); and a post-processor that records the printing results (e.g., print time, pictures of the print, etc.) and tracks different jobs.

After the user submits the print job with corresponding platform configurations and job settings, a software module is used to translate the print job into G-code commands executed by the SCARA robots and the mobile platform. Next, a chunk-based slicer may be used which consists of four modules, chunker, scheduler, slicer, and simulator.

Figure 8:
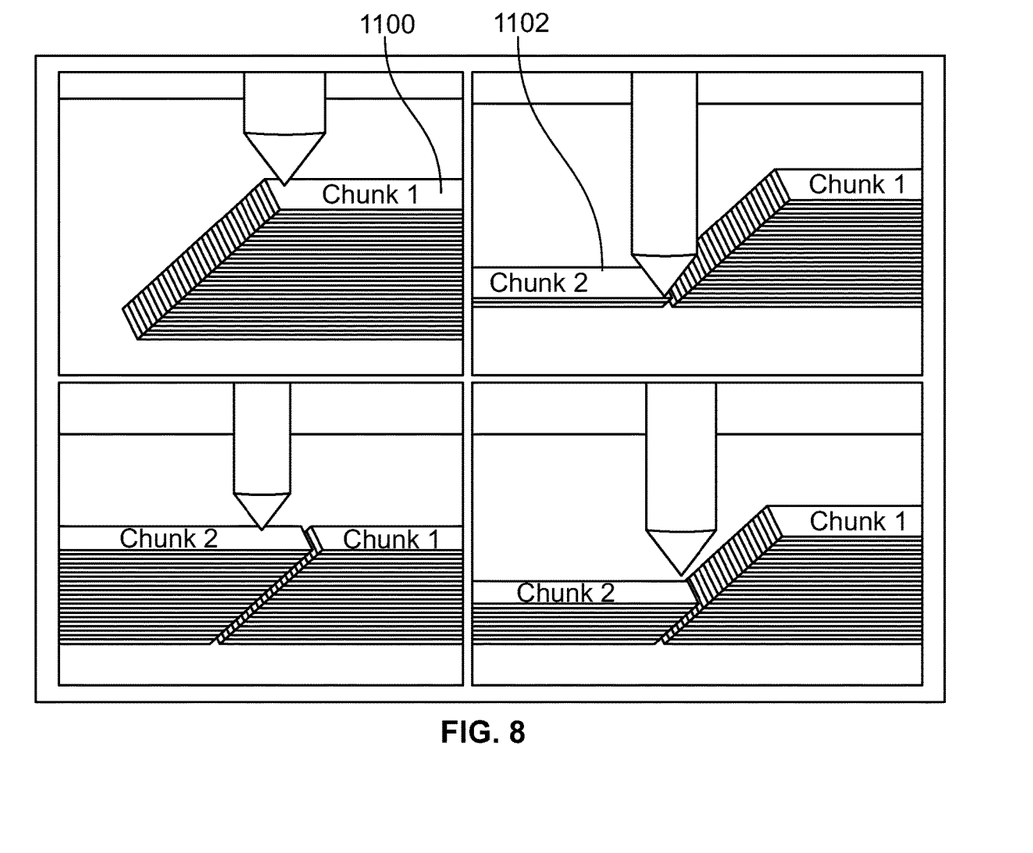
FIG. 8 illustrates a printing process of two adjacent chunks (a) Chunk with no overhang is printed first (b) Second chunk, with overhang is printed adjacent to the first chunk as heating nozzle touches the surface of first chunk (c) Continuation of the printing of chunk 2 (d) Chunk 2 is printed and the bond between the chunks is created instantly for an embodiment of the present invention.

As shown in FIG. 8, a sloped-surface chunking strategy may be used where adjacent chunks have a sloped surface. In this method, a positive slope chunk 1100 is printed first, which can support overhang or the negative slope of chunk 1102. Once chunk 1 is printed, the nozzle starts printing chunk 1102. In doing so, the heated nozzle touches the surface of chunk 1100, melting the material from the top surface and depositing new material for chunk 1102. This creates instant bonding between the two chunks.

In the same side chunking, chunking begins at one end of the part and iteratively moves towards the other side rather than moving in both directions. This approach is especially useful if the floor space is limited and does not have enough space available for SCARA printers to print on each print job side.

Figure 9A:
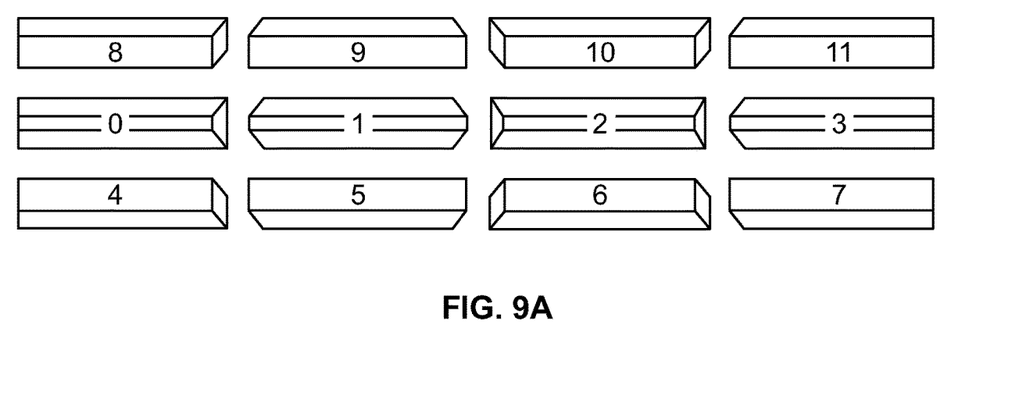
FIG. 9A shows a chunked part with marked chunk numbers.
Figure 9B:
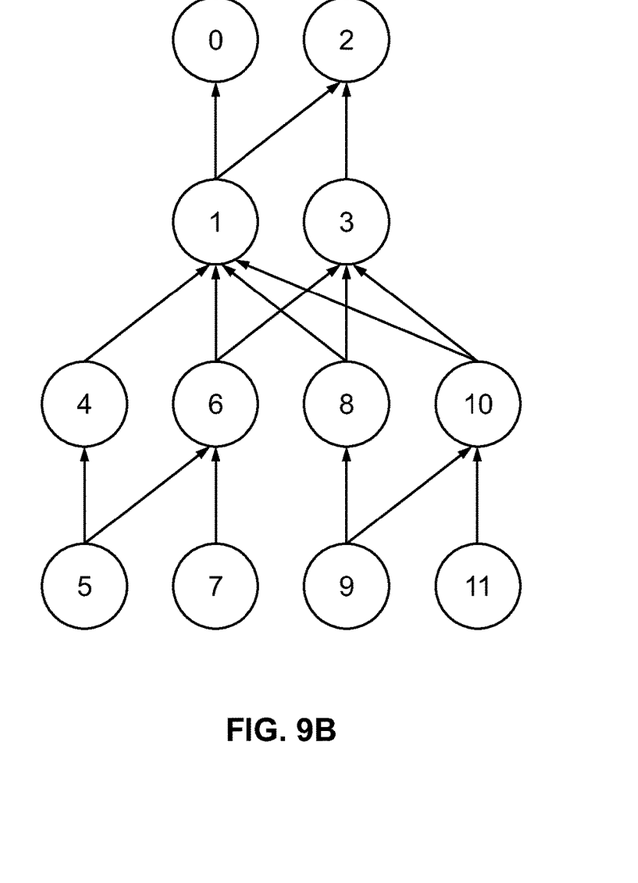
FIG. 9B shows a print schedule represented using Directed Dependency Tree (DDT).

Once the chunks are generated, the chunks will be assigned to individual robots and scheduled for printing based on their dependencies. The dependencies are introduced due to the shared sloped surfaces between adjacent chunks—the chunks with overhanging slopes cannot be printed before their adjacent chunks that support the overhanging slopes are printed. For example, Chunk 1102 cannot be printed before printing chunk 1100. Such dependencies can be represented using a dependency tree where each node represents a chunk, and an edge between nodes represents a dependent relationship between the chunks. FIG. 9 shows a rectangular bar chunked into 12 chunks. Based on the dependency tree, chunk 0 and chunk 2 must be printed first, followed by chunk 1 and chunk 3. Once chunk 1 is printed, chunk 4 can be printed, and similarly, chunk 6 can only start printing once chunk 1 and chunk 3 are printed. This logic is followed until all the chunks from the dependency tree are printed. Meanwhile, all the chunks on a single column of the dependency tree are assigned to one robot. For example, chunks 0, 1, 6, and 7 can be assigned to the one robot, chunks 4 and 5 to the second one, chunks 3, 8, 9 to the third robot, and the rest to the fourth robot.

Once a print schedule is generated, the chunks need to be sliced for printing operations. The slicer takes the STL model of individual chunks outputted by the chunker and generates G-code for each of the chunks based on the slicer settings provided by users, such as infill density, print speed, layer height, etc. Although existing open-source slicing software such as Cura can provide a stable solution to slicing the resulting chunks, it cannot handle cooperative printing. To overcome this issue, the present invention uses an add-on feature in Cura that allows both slicing and scheduling.

Figure 10:
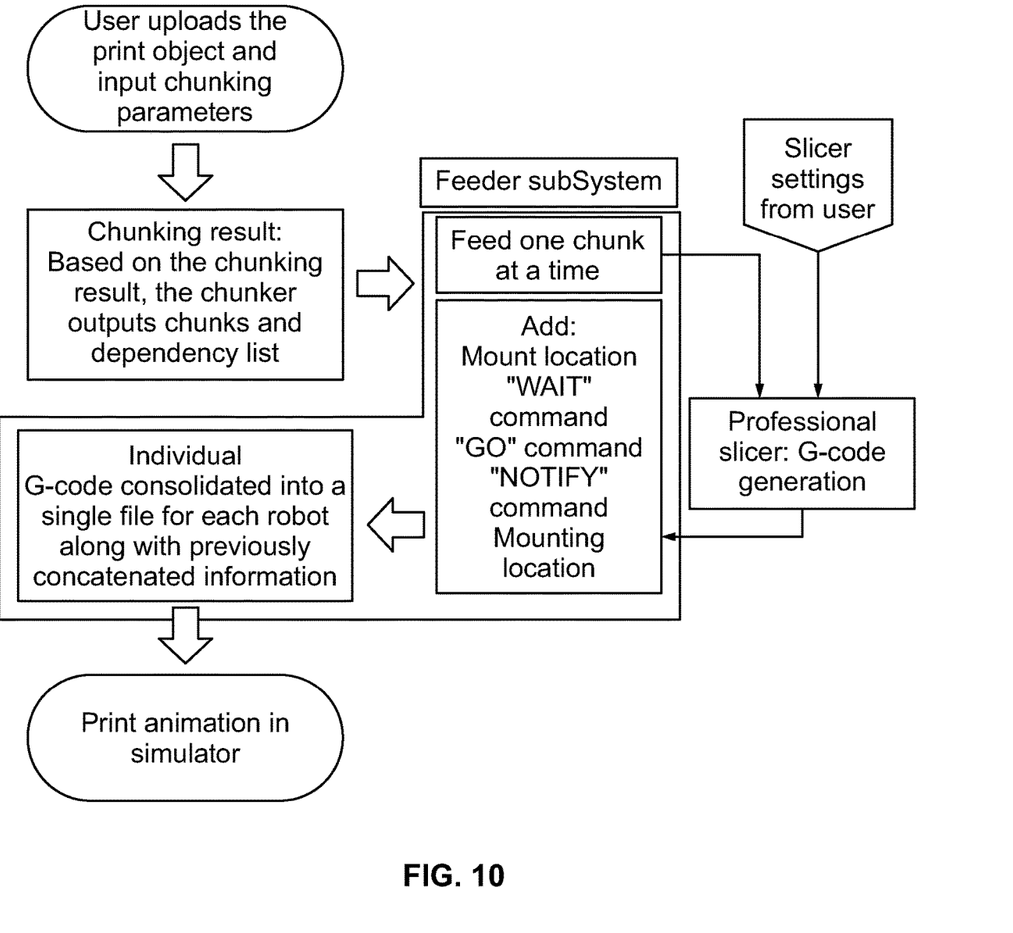
FIG. 10 is a flowchart of a chunking-based slicer system for an embodiment of the present invention.

Thus, once the G-code is generated by Cura slicer, the modified slicer adds "WAIT" and "NOTIFY" to implement the dependency based on the scheduler's print schedule. It also adds information such as the current location of the robot and mount location on the floor grid point. The "WAIT" command is added at the beginning of the G-code for chunks that cannot be printed before its dependency is printed. "NOTIFY", on the other hand, is added at the end of the G-code for the chunks on which other chunks depend. The whole process is illustrated in FIG. 10. Once all this information is added, the G-code of all chunks belonging to each robot is coalesced into one G-code file and sent to the local server for distribution.

The communication between the hardware components takes place via a wireless network. Both the SCARA printer and the mobile platform are equipped with wireless communicators and connected to the local central server via the wireless network. After chunking, scheduling, slicing, and compiling of all G-code are done in the remote server (ambots.net), the information is sent to the local central server via the web-based UI. The combined G-code files are then sent to their assigned SCARA printers wirelessly for execution. Two special commands require communication between robots: NOTIFY and MOVE, where NOTIFY notifies a specified printer that it can resume printing because its dependency has been satisfied, and MOVE requests the mobile platform to pick up the SCARA printer and move it to a different location.

Figure 11A:
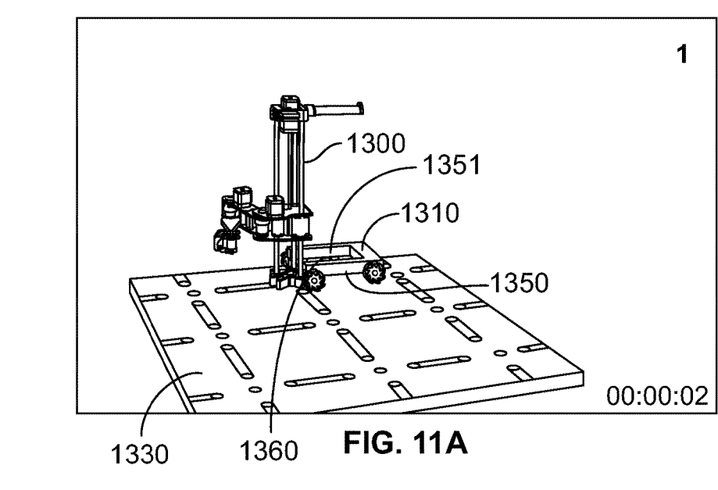
FIGS. 11A, 11B, 11C, 11D, 11E, 11F, 11G, 11H and 11I illustrate how a mobile platform repositions a printer on a printing floor for an embodiment of the present invention.
Figure 11B:
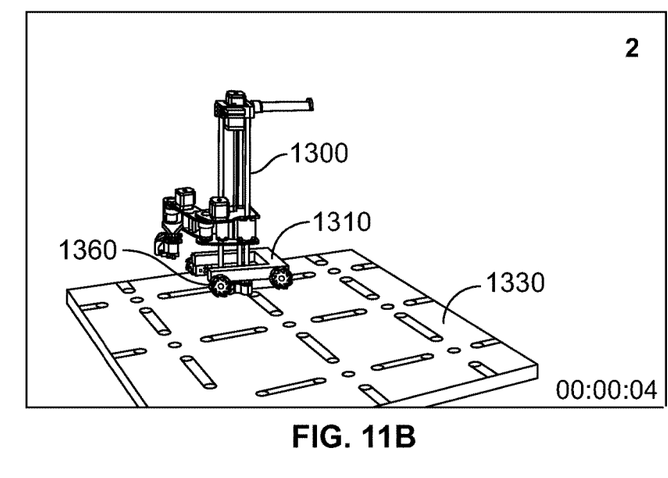
Figure 11C:
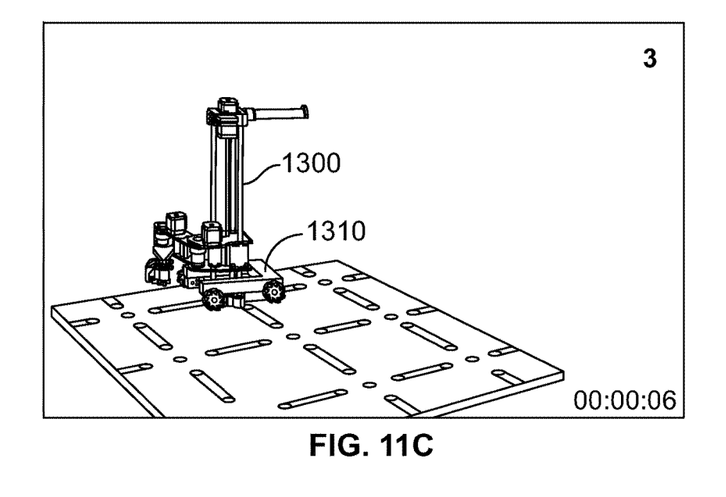
Figure 11D:
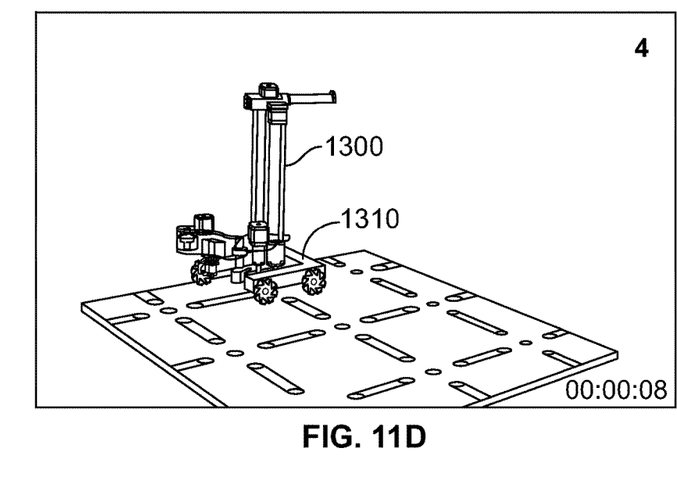
Figure 11E:
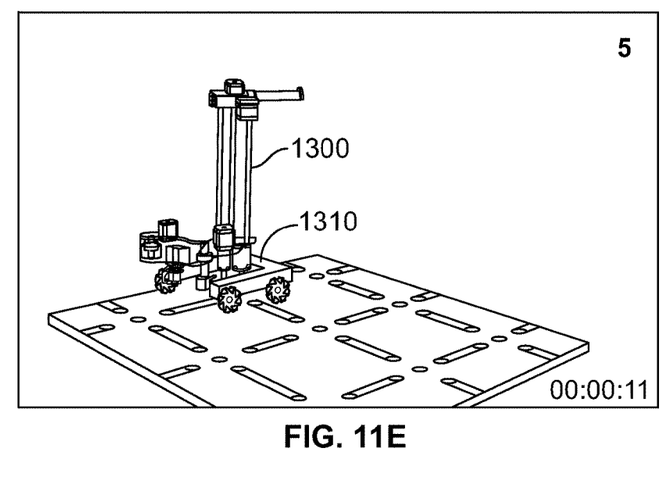
Figure 11F:
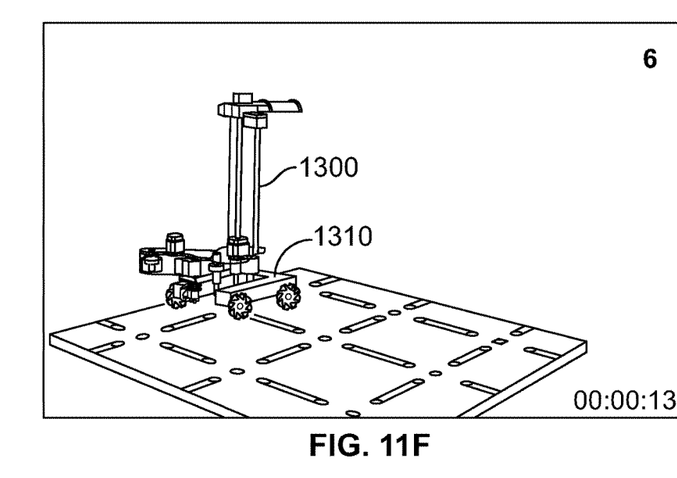
Figure 11G:
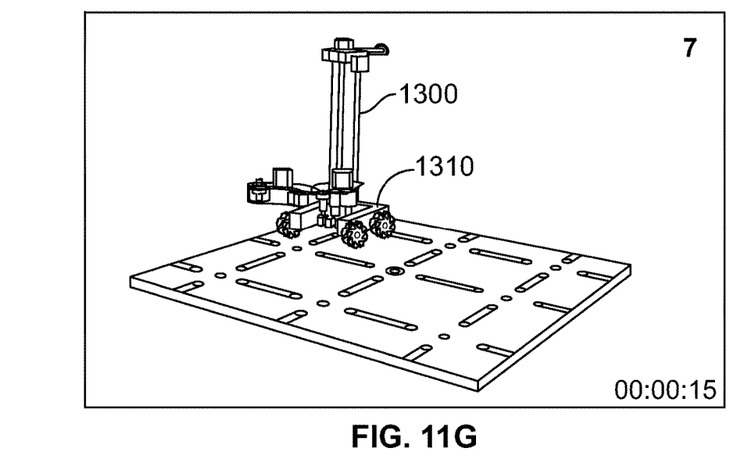
Figure 11H:
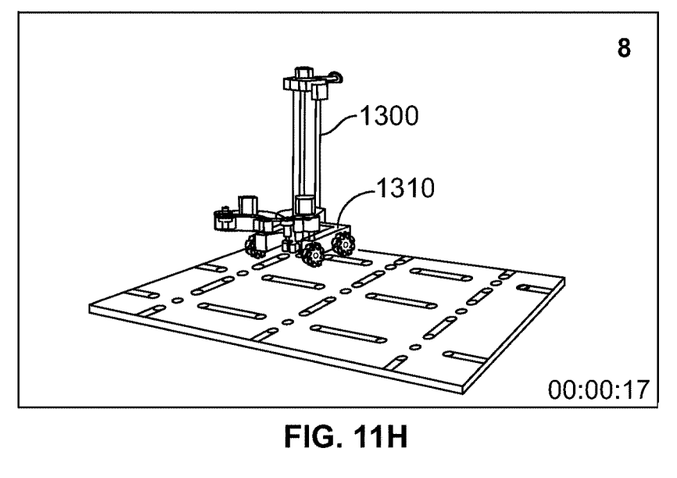
Figure 11I:
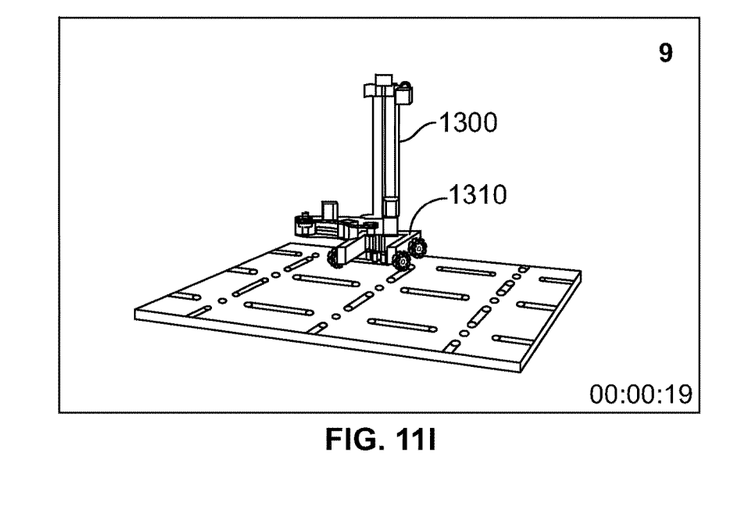

As shown in FIG. 11A-11I, one or more SCARA arms 1300 may be carried by mobile platform 1310. As shown in FIG. 11A, mobile platform 1310 includes arms 1350 and 1351 define opening 1360. As shown in FIG. 11A, when robot 1300 is mounted to floor 1330, it is in a mounted position where robot 1330 is connected to floor 1330. To transition from a mounted position to a transport position, mobile transport 1310 connects to robot 1300 causing robot 1300 to disengage from the floor. This causes robot 1300 to disengage from floor 1330 and comes to rest on mobile platform 1310. As shown in FIGS. 11C-11I, robot 1300 is moved by mobile platform 1310 to a predetermined location on the floor. Once the mobile platform reaches a desired predetermined location, it is wirelessly notified to initiate the process in which the robot is lowered and mounted to the floor. Once this is finished, the mobile platform, the mobile platform unmounts itself simultaneously and may retract to its charging station or navigates to a different location for transporting another printer.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A manufacturing system comprising: a plurality of positionable robots, at least one transporter; and a plurality of connectable floor tiles having an x-axis and y-axis;

said transporter has a plurality of omnidirectional wheels, at least one motor, a plurality of spaced apart carrier mounts, a power source and an opening;

each of said robots having a base, said base sized to fit within said opening of said transporter;

said base positionable between a mounted position and a transport position;

when said base is in said mounted position, said base is connected to one or more of said floor tiles; and when said base is in said transport position, said base is disconnected from said floor tiles.

2. The system of claim 1 further including a plurality of robot mounts located on said robot and a plurality of carrier mounts located on said transporter, said robot mounts connected to said carrier mounts when said base is in said transport position, and said robot mounts are disconnected from said carrier mounts when said base is in said mounted position.

3. The system of claim 2 further including a plurality of mounting holes, each of said holes have a predetermined location on said x and y axes of said floor tiles.

4. The system of claim 3 further including a plurality of detectable markers, said detectable marker are used by the system to determine the orientation of said transporter on said floor tiles and the location of said transporter on said floor tiles.

5. The system of claim 4 wherein said detectable markers include one or more codes, each of said codes provides information on a direction of movement of said transporter and the location of said transporter on said floor.

6. The system of claim 5 wherein said plurality of mounting holes provide power to said robot.

7. The system of claim 6 further including a plurality of mounting locks, said locks connect said base to said floor when said base is in said mounted position.

8. The system of claim 7 wherein said mounting locks provided power to said base when said base is in said mounted position.

9. The system of claim 8 wherein said transporter provides power to said base when said base is in said transport position.

10. The system of claim 9 wherein power is provided to said base through said carrier mounts and said robot mounts.

11. The system of claim 9 further including a plurality of build plates, said build plates are releasably connected to said floor tiles.

12. The system of claim 11 wherein said build plates include a plurality of connection points that nest with one or more of said floor tiles.

13. The system of claim 12 further including a plurality of build plate makers, each build plate marker having a predetermined location on said x and y axes of said build plates.

14. The system of claim 13 wherein said robot includes a moveable arm having at least one sensor, said sensor adapted to sense at least four different build plates markers to determine the location of said sensor relative to said build plate.

15. The system of claim 13 further including a battery charger and wherein said power source is a battery.

16. The system of claim 3 wherein said plurality of robot mounts and said plurality of carrier mounts nest together when said base is in said transport position.

17. The system of claim 4 further including one or more navigation paths, said paths are detectable by said transporter and said transporter adapted to follow said plurality of navigation paths, said navigation paths are used by the system to determine the orientation of said transporter on said floor tiles and the location of said transporter on said floor tiles.

18. The system of claim 13 further including a plurality of robots and a plurality of transporters.

19. The system of claim 18 further including a local wireless network consisting of a local server, said plurality of robots and said plurality of transporters; said local server adapted to send commands to one or more of said transporters to move one or more of said robots from one location on said plurality of floor tiles to another location.

20. The system of claim 19 wherein said robots do not communicate with one another and said local server is adapted to direct the operation of each robot and each transporter.

21. The system of claim 20 wherein a print job is divided into chunks and said server is adapted to prevent chunks with overhanging slopes from being printed before adjacent chunks that support the overhanging slopes.

* * * * *